July 17, 1962 R. R. CROUSORE 3,044,215
HOLDER FOR PLANT CUTTINGS
Filed Dec. 18, 1959
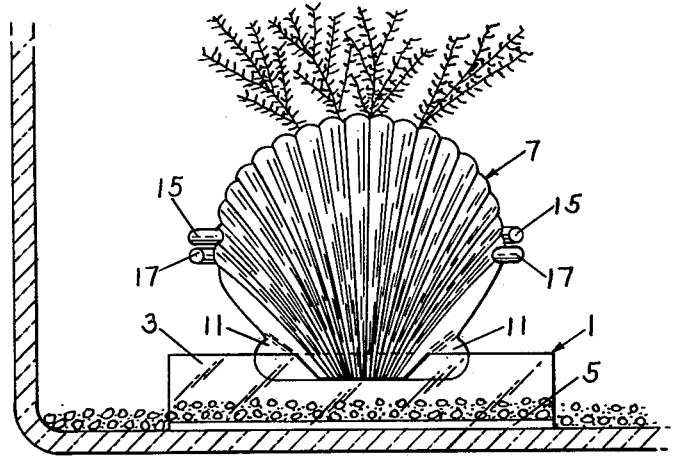
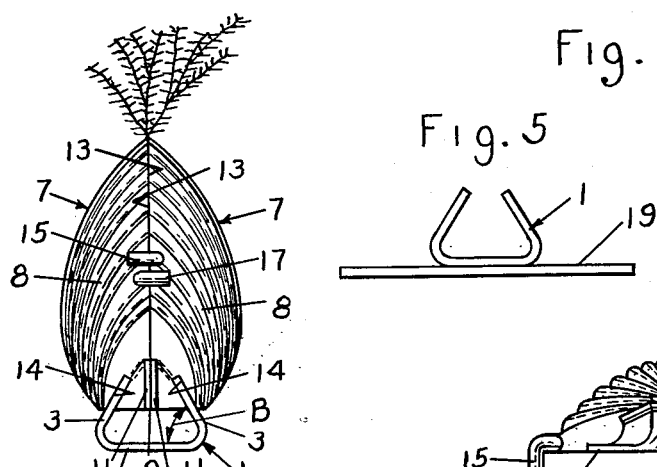
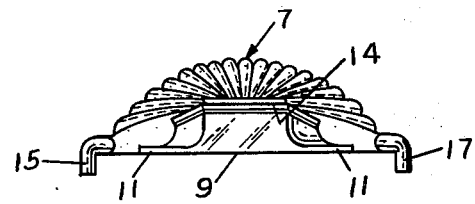
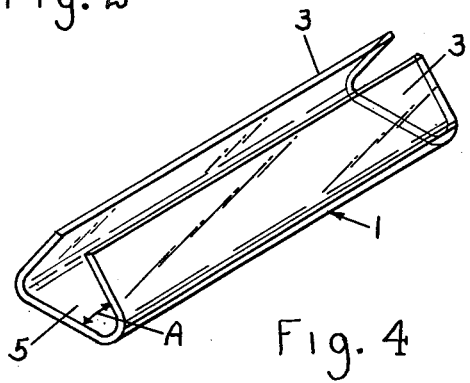
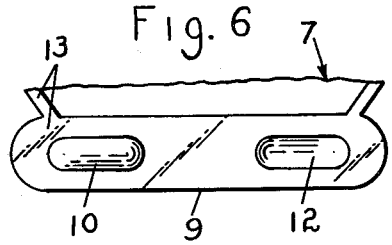
INVENTOR.
RICHARD R. CROUSORE
BY
Edmund W. E. Kamm
ATTORNEY 3,044,215
HOLDER FOR PLANT CUTTINGS
Richard R. Crousore, 818½ 14th St., Santa Monica, Calif.
Filed Dec. 18, 1959, Ser. No. 860,487
9 Claims. (Cl. 47—41)

This invention relates to a holder for plant cuttings such as moss, leaves, ferns, flowers etc., and is constructed to releasably clamp such cuttings firmly and hold them in desired positions and arrangements.

The holder is preferably made in a decorative shape and is suitably colored to provide the desired aesthetic effect. It may be made in any desired form which is consistent with the mechanical requirements of the supporting and clamping structure.

The invention is disclosed herein in one form which is particularly suitable for holding sprigs of fern or moss in an aquarium and takes the general form of a scallop shell.

FIGURE 1 is a front elevation of the holder shown disposed in an aquarium.

FIGURE 2 is an end elevation of the holder.

FIGURE 3 is a bottom view of one clamping jaw of the holder showing the base receiving slot and the fulcrum edge.

FIGURE 4 is an isometric view of the yieldable, resilient base of the holder.

FIGURE 5 is a modified form of base having a larger supporting area.

FIGURE 6 shows a modification having detent means for preventing the relative displacement of the jaws.

Referring to the drawings, the numeral 1 designates the base or clamp which is made of yieldable material such as sheet plastic or may be of light spring metal. In the form shown, which is intended for use under water, the clamp is preferably made of formed sheet plastic material such as polyethylene which is thermoplastic and yieldable but is resilient so that it springs back to the shape to which it was originally formed. A strip of such material has its longitudinal edges bent upwardly and inwardly to form opposed clamping walls or arms 3 which are joined at the bottom by a base portion 5 and which form an angle A therewith, so that the free ends of the walls converge toward each other. The forming of the base may have to be performed under heat, with thermoplastic material, so that the clamp will retain the required shape as shown in FIGURE 4.

The holder jaws 7 are identical parts which may be of metal, ceramic, plastic or other material. As shown, they are made of molded plastic and each jaw is made in the form of a half of a scallop shell and has a contoured surface 8 on one face and a planar surface 13 on the opposite face. The surfaces 8 and 13 join along one edge of the jaw so that the planar surface 13 at this edge serves as a clamping lip.

Whatever outward forms the jaws may take, it is necessary that the bottom inner edge of each jaw be provided with a substantially straight, horizontal edge 9 which serves as a fulcrum, about which the jaw may rotate. This edge preferably has a substantial length to assist in maintaining the jaws parallel while cuttings are being inserted and to provide such lengths, the jaws, in this example, are provided with laterally extending tabs 11 at each side adjacent the bottom. As illustrated in the drawing, the fulcrum is provided by the edge 9 of the planar surface 13, which edge is opposite the clamping lip.

To hold the fulcrums of the two jaws in proper pivotal engagement, it may in some cases be desirable to provide a projection 10 and a corresponding indentation or socket 12 (FIGURE 6) disposed closely adjacent the bottom of each jaw and on the planar side 13. The projection and indentation are preferably elongated, disposed parallel to the fulcrum 9 and equally spaced on each side of the vertical center line of the jaw, so that the projection of each jaw will enter the indentation of the other jaw when the holder is assembled.

At least the upper and lower ends of the jaws terminate in the planar surface 13 and are adapted to abut each other. The upper surfaces serve to clamp the cuttings therebetween and the lower surfaces each serve as a rest for the fulcrum edge of the opposite jaw.

Each jaw is provided with an upwardly and inwardly directed slot or clamp receiving seat 14 which extends substantially at an angle B relative to the bottom of the jaw, which is substantially parallel to the base portion 5. The angle B is preferably somewhat larger than angle A so that the arms 3 of the clamp will be spread and thus tensioned, when the jaws are mounted in the clamp. Thus, the portion of the arms which engage the jaws are spaced apart no greater than the distance between the outer surfaces of the jaws where the arms engage the jaws when the latter are in contacting relation, whereby the tension in the clamp is such as to apply force to move the jaws from a noncontacting toward a contacting relation.

As shown in FIGURES 1 to 3, a finger piece or prong 15 extends from one side of the jaw somewhat laterally and then at right angles, substantially perpendicular to and beyond the plane 13 of the jaws. A similar finger piece 17 extends from the other side edge of the jaw. The finger pieces 15 and 17 are disposed at different but closely adjacent levels so that they will pass each other, as shown in FIGURES 1 and 2.

*Operation*

To assemble the holder, two of the jaws 7 are placed with the surfaces 13 and fulcrums 9 together. The arms 3 at one end of the clamp are spread sufficiently to enable them to enter the slots 14 and the clamp is then pushed endwise in the slots until the jaws are substantially centered relative to the clamp, as shown in FIGURE 1.

The jaws are thus held firmly together by the pressure of the spread arms 3 of the clamp.

To insert the sprigs of moss or other cuttings 19, the finger pieces 15, 17 on one side of the holder are grasped between the index finger and thumb of one hand and depressed to open the clamp, the sprigs are inserted between the jaws and the finger pieces are released. The clamp thereupon forces the jaws into gripping relation against the sprigs.

Obviously, the pressure of the jaws may be controllably released, one either side of the holder, by judicious application of pressure on the proper finger pieces, to permit movement of the sprigs to the positions required to produce the desired arrangement.

When the holder has been filled, it is placed on the floor of the aquarium and gravel is brushed into the clamp portion to weight it and hold the assembly upright.

Obviously, if desired, other weighting means such as a metal rod may be inserted longitudinally in the clamp. As indicated above, the holder may be made in various forms, shapes and sizes and may be used for holding flowers, leaves, ferns, etc. In some cases, a wider and more substantial base may be required. Such a base may consist of a plate of plastic 19 cemented to the base 5 of the clamp 1 or it may be a metal plate which is riveted to the base in one or more places. The weight and size of the plate will of course be a matter of choice.

Since it is obvious that the structure can be made in various forms, styles and sizes, applicant does not wish to be limited to the particular form disclosed for purposes of illustration but desires protection falling fairly within the scope of the attached claims.

I claim:

1. A holder for decorative plant cuttings and the like, comprising a pair of similar jaws each having a fulcrum at one end and a clamping lip at the other, a clamp for holding said jaws with the respective fulcrums and clamping lips in opposed, aligned, contacting relation, said clamp including a base disposed substantially parallel to said fulcrums, said base having resilient arms disposed to extend, on opposite sides, past said fulcrums and into engagement with said jaws intermediate said fulcrums and said clamping lips, the engagement portion of said arms being spaced apart a distance no greater than the distance between the outer surfaces of the jaws where the arms engage the jaws when the latter are in said contacting relation, so as to apply force to move said jaws from a noncontacting toward the contacting relation.

2. The structure defined by claim 1, which includes jaw opening means comprising a prong on each jaw disposed intermediate the clamping lips and the arms of said clamp and also disposed to extend across the edge of the opposing jaw, said prongs overlapping each other, whereby pressure applied simultaneously to the free ends of the prongs will open said jaws.

3. The structure defined by claim 2 which includes a pair of prongs disposed on opposite side edges of said jaws.

4. A jaw for a holder having a contoured surface on one face and having a planar surface on the opposite face, the contour surface and planar surfaces joining along one edge to form a clamping lip, said planar surface providing a fulcrum at the edge opposite the clamping lip, the jaw having a clamp receiving seat disposed between the clamping lip and the fulcrum on the face having the contour surface.

5. The structure defined by claim 4 which includes a prong disposed on each of two opposite side edges of said jaw and at different perpendicular distances from the fulcrum, so that when two such jaws are disposed in opposed clamping relation, the adjacent prongs of the two jaws will mutually and closely overlap.

6. A holder for decorative cuttings and the like, comprising a pair of jaws each having a fulcrum at one end, a clamping lip at the other and means defining a seat disposed between said fulcrum and lip, a clamp for holding a pair of said jaws with the respective lips and fulcrums in pressure contact, said clamp comprising a base extending substantially parallel with said fulcrums and having spaced resilient arms extending from said base, past said fulcrums on opposite sides thereof, to said seats, the ends of said arms resting on said seats, said seats being spaced from each other a greater distance than the ends of said arms before assembly of the jaws and clamp so that the arms will be tensioned in a direction to close said jaws when the holder is assembled.

7. The structure defined by claim 6 wherein said seats comprise a slot in each jaw, said slots extending substantially parallel to said fulcrum means and converging upwardly therefrom at a predetermined angle, said clamp arms converging upwardly from said base at an angle which is less than said predetermined angle, said arms being spread when occupying said slots and serving to urge said clamping lips into clamping relation.

8. The structure defined by claim 6 which includes a prong on each jaw, said prongs being disposed in closely overlapping relation with respect to each other and the opposite jaw and at a level between said clamping lips and said clamp arms so that pressure on the ends of said prongs will spread said jaws.

9. The structure defined by claim 1 which includes interfitting detent means comprising a projection and a socket on each jaw, respectively arranged symmetrically on opposite sides of the vertical centerline of the jaw, the projections of the respective jaws being disposed in the sockets of the opposite jaw when said holder is assembled, to hold said fulcrums in pivotal engagement.

References Cited in the file of this patent

UNITED STATES PATENTS

| | | |
|---|---|---|
| 618,686 | Kleinstuber | Jan. 31, 1899 |
| 2,661,144 | Morris | Dec. 1, 1953 |
| 2,843,899 | Homand | July 22, 1958 |